United States Patent [19]

Sitzler

[11] 4,417,866
[45] Nov. 29, 1983

[54] PRESS FOR THE CONTINUOUS PRODUCTION OF PRESSEDBOARD

[75] Inventor: Hans-Dietrich Sitzler, Nettetal-Hinsbeck, Fed. Rep. of Germany

[73] Assignee: G. Siempelkamp GmbH & Co., Krefeld, Fed. Rep. of Germany

[21] Appl. No.: 373,225

[22] Filed: Apr. 29, 1982

[30] Foreign Application Priority Data

May 6, 1981 [DE] Fed. Rep. of Germany ....... 3117778

[51] Int. Cl.³ .............................................. B29J 5/08
[52] U.S. Cl. ................................ 425/364 R; 425/363; 425/371
[58] Field of Search .................... 425/364 R, 371, 363

[56] References Cited

U.S. PATENT DOCUMENTS

| 3,005,230 | 10/1961 | Hütter | 425/364 R |
| 3,689,612 | 9/1972 | Taga | 425/364 |
| 3,709,647 | 1/1973 | Barnhart | 425/363 |

FOREIGN PATENT DOCUMENTS 2215618 10/1973 Fed. Rep. of Germany.
327433 3/1958 Switzerland.

Primary Examiner—James R. Hall
Attorney, Agent, or Firm—Karl F. Ross; Herbert Dubno

[57] ABSTRACT

A press for the continuous production of pressedboard utilizes a pair of steel pressing belts running over respective surfaces of a platen defined by gaps into which steel rollers are fed. The rollers which have diameters of less than 20 mm are fed with a spacing which corresponds substantially to the thickness of the belts and have diameters equal to substantially ten times this thickness.

6 Claims, 3 Drawing Figures

PRESS FOR THE CONTINUOUS PRODUCTION OF PRESSEDBOARD

FIELD OF THE INVENTION

The present invention relates to a mat-pressing apparatus and more particularly, to an apparatus for use in the production of so-called "pressedboard."

BACKGROUND OF THE INVENTION

In the production of pressedboard—a so-called "mat" of particles is prepared by an appropriate deposition or dispensing station, generally upon a continuously moving surface and is possibly subjected to preliminary pressing and thereafter may be compressed to the desired density.

The particles may be sawdust, wood chips or wood fibers or other cellulosic and even mineral or other organic particles and fibers and may contain natural binders or synthetic binders which are added to the mass and are thermally activated by the pressing process.

Depending upon the degree of pressure and heat applied, the products may range in density from comparatively low values to extremely dense products. The low-density materials are suitable for use as insulating board, for example, while the more dense material can be used for load-supporting and structural purposes, e.g. as walls for buildings, in furniture structures and the like.

The apparatus for producing pressedboard can include continuous mat or layer-forming devices wherein, for example, the comminuted material, with or without binders of the type described, is passed between a pair of platens, via a pair of continuously moving surfaces which entrain the material in the form of a layer between these platens and serve to confine the material while it is between the platens.

The platens can be heated and the pressing operation serves to compact the comminuted mass and to harden any thermally activating binders.

When the system produces a continuous mat or layer, the pressedboard leaves the press in the form of a continuous web which is subdivided e.g. by a transversely movable saw, into individual boards downstream of the press.

The reference to "pressedboard" herein should be understood to also include laminates in which at least a core is formed from comminuted materials, i.e. particulates and fibers.

In German patent document (open application) No. 22 15 618, a system is disclosed whereby the layer of comminuted material is carried on a transport belt over the lower platen, is covered from above by a continuous pressing belt interposed between this layer and the upper platen, while between the belt and the respective platens cageless and chainless steel rods roll, these rods forming roller bearings and being circulated from and to the gaps between the pressing belts and the platens. The rods thus function as extremely long roller bearings which can extend the full width of the layer and the belts.

In the system of this German patent document, the diameters of the rods, the thicknesses of the pressing belts and the width of the gaps between the steel rods in the rod-receiving compartments between the pressing belts and the platens are dimensioned so that the belts are subjected to an elastic deformation in the pressing region. The difficulty, however, is that over the long stretches between the platens, the linear path of the rods within these gaps tend to be distorted, the spacing tends to change and the rods tend to bunch up, contact one another and rub against one another although originally they were effectively spaced apart upon entering the compartments.

Obviously this can be partially prevented by utilizing a chain or cage system for holding the rods apart with a predetermined spacing but this has other disadvantages.

As a result of the tendency of the rods or bars to come into contact with one another, i.e. run together, wear develops which can require expensive maintenance and replacement of the rods. In addition the bunched rods or bars tend to jam together and to block continuous movement.

For these reasons practical application of the system has not developed to any significant extent.

In another system represented by Swiss Pat. No. 327,433, the dimensioning is effected such that elastic deformation does not occur and the pressing belts do not deflect between the rods materially. This results in a press operating with pressures of 20 to 50 kp/cm$^2$ and the relatively thick belts which must be used at such high pressures to avoid the deflection. Naturally such thick belts must be guided on comparatively large diameter drums at least where these belts are directed toward and away from the path of the layer.

Furthermore, experience has shown that even this does not end the problem unless caging of the rods or bars is provided or the bars and rods are connected together in a chain or the like.

The capital costs are therfore high, maintenance costs also high or prohibitive and there is no guarantee that undesired wear will be eliminated.

OBJECTS OF THE INVENTION

It is the principal object of the present invention to provide an improved pressing device of the type described whereby the aforementioned disadvantages are obviated.

Another object of this invention is to provide a continuous press of the character described whereby the rods or bars need not be held in a spaced-apart relationship by cages or chaining, the pressing belts do not have to be exceptionally thick, and it is not necessary to use especially large diameter drums to guide these belts, while eliminating excessive wear and preventing the rollers or bars from bunching up.

Still another object of the invention is to provide an apparatus for the production of pressedboard which prevents the rollers or bars from running onto one another in a manner characterizing earlier systems.

SUMMARY OF THE INVENTION

These objects and others which will become apparent hereinafter are attained with the invention which is based upon my discovery that disturbances in the uniform movement of the rods or bars (hereinafter rollers), in the space between the flexible steel pressing belts and the press platens, can be avoided by appropriate dimensioning of the roller diameter and the pressing belt thickness. Indeed, it is most surprising that such a relationship could exist under which the mat or layer can be continuously pressed and formed into pressedboard utilizing cageless and unchained rollers without bunching of the rollers.

More particularly, I have found that the rollers should have diameters below 20 mm and, moreover, that the diameter D of the rollers should be approximately ten times the thickness d of the steel-pressing belts, i.e. D≅10 d, and that the roller should be fed into the respective compartments or gaps with a spacing s equal approximately to the thickness d, i.e. s≅d.

For reasons which are not fully understood after considerable investigation of the phenomenon, when these conditions are ensured, the rollers appear to move completely uniformly or for long operating periods without tending to ride up on one another or fall behind so as to engage rearwardly disposed rollers. Apparently the result has something to do with the fact that elastic deformation of the pressing belts is somewhat limited so that the belts notwithstanding their intrinsic flexibility, appear to act as rigid rather than flexible members.

Especially effective results are obtained when the steel pressing belts have thicknesses between 1.1 and 1.8 mm, the relationships given above are exact, i.e. the rollers have diameters of 11 to 18 mm, i.e. exactly ten times the thicknesses of the bands which are engaged by them.

Optimum results are obtained when the thicknesses of the bands are 1.4 to 1.6 mm and the roller diameters are 14 to 16 mm.

The deviation of the roller diameters from these values should be less than 15 microns and preferably less than 10 microns.

To ensure the proper spacing s, on introduction of the rollers, the roller feed device can utilize toothed wheels, preferably with ejectors in the gaps between teeth, to feed the rollers into the gaps, the toothed wheels being synchronously driven with the pressing belts.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
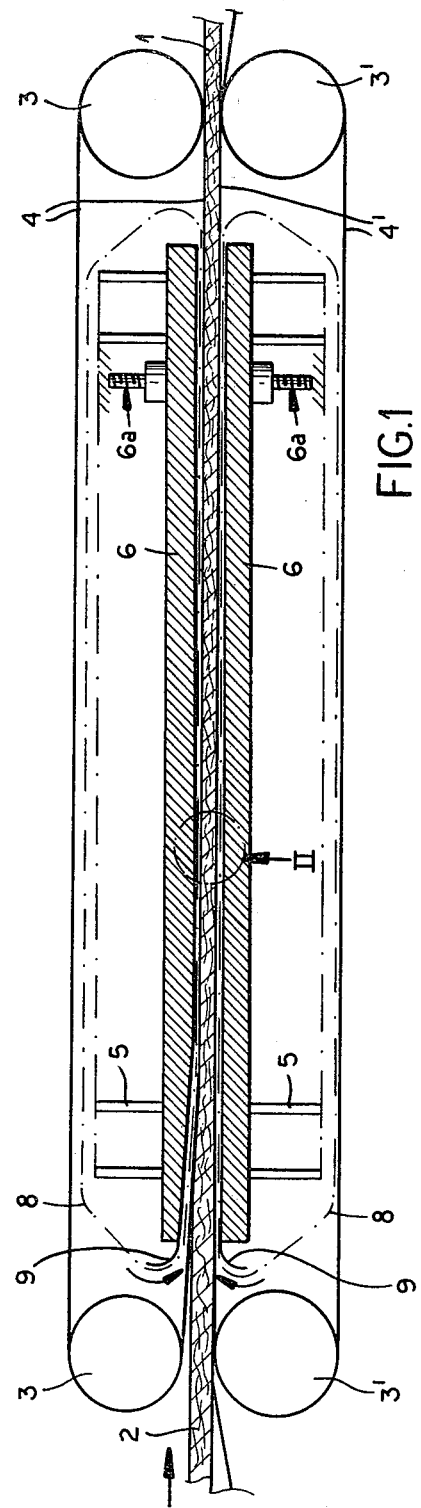
FIG. 1 is a side-elevational view, partly in section, diagrammatically illustrating an apparatus according to the present invention.
Figure 2:
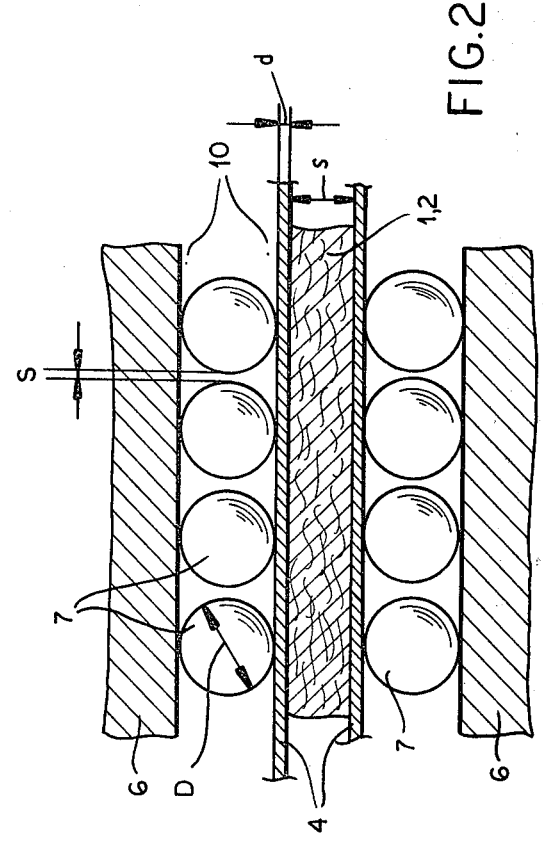
FIG. 2 is a detail view representing a section of the region II of FIG. 1, drawn to a larger scale.

FIGS. 1 and 2 show an apparatus for the production of pressedboard, i.e. fiberboard or particleboard, by the hot pressing of a continuous mat 2 into the pressed product 1. The means for heating the platens are conventional in the art and have not been illustrated.

The apparatus comprises an upper steel flexible pressing belt or band 4 which passes over a pair of deflection rollers 3 and is continuously propelled by a drive 20 (FIG. 3) while a corresponding lower belt 4' passes over a pair of rollers 3' which are also driven by the drive 20.

The rollers 3 and 3' are mounted on a press frame represented diagrammatically at 5 and also carrying a pair of press platens 6 which are, as indicated, heated.

The distance s between the pressing belts 4 (FIG. 2) can be adjusted by moving the platen 6 toward and away from one anotheer via adjusting means represented diagrammatically at 6a and representing screw jacks.

Between each platen 6 and the respective pressing belt 4 there is provided a compartment 10 into which cageless and chain-free steel rods or bars 7 of a cylindrical configuration are fed.

These bars or rods, hereinafter referred to as rollers, are circulated along the dot-dash path represented at 8 and have a diameter of less than 20 mm.

Figure 3:
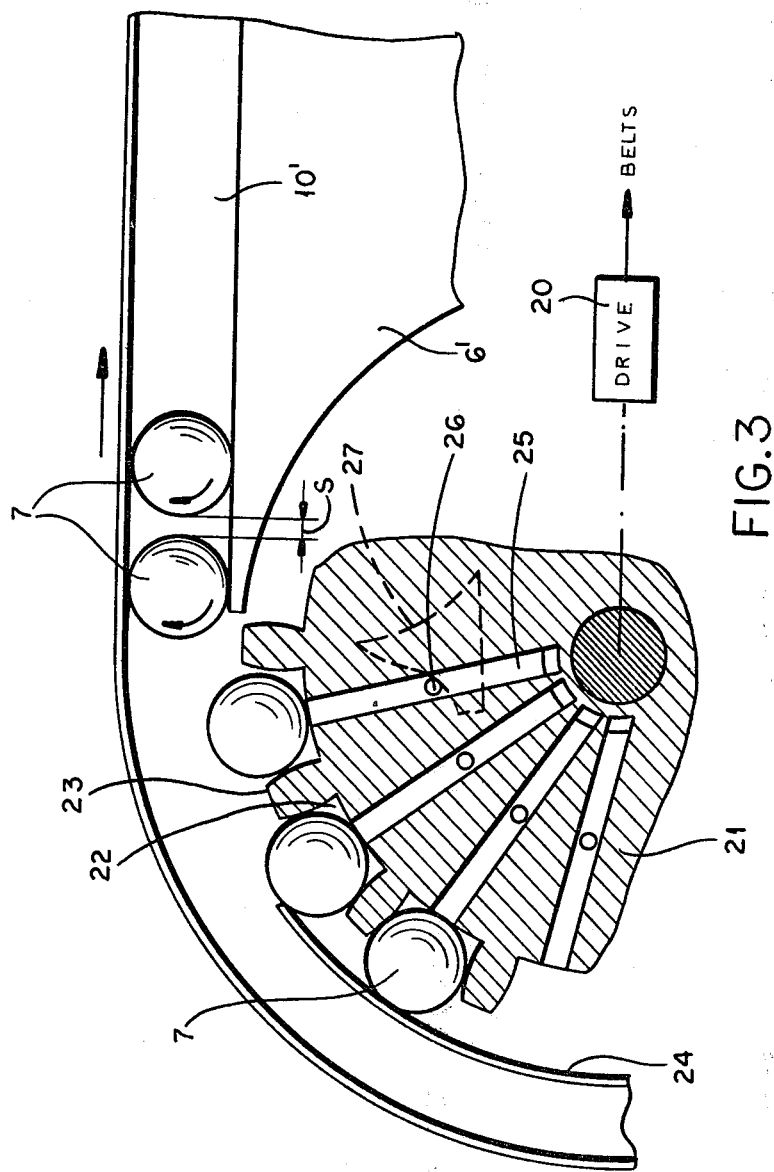
FIG. 3 is a diagram, also partly in section, illustrating part of an apparatus for feeding the rollers into the gap between a pressing band and a platen in accordance with this invention.

The means for feeding the rollers into the gaps 10 is represented in FIG. 1 at 9 and has been shown in somewhat greater detail in FIG. 3.

More particularly, these means can include a pair of toothed wheels 21 (only a part one of which has been shown at FIG. 3) on opposite sides of each press platen, e.g. the press platen 6' in FIG. 3 and corresponding to the lower press platen, the wheels 21 pick up rollers 7 in the gaps 22 between the teeth 23.

A guide 24 ensures that the rollers 7 will enter and ride in the gaps 22 until these gaps arrive at the upstream edge of the respective platen, e.g. the platen 6'.

At the upstream edge of each platen, radial slides or ejectors 25 associated with each gap have their cam follower rollers 26 cammed radially outwardly by a fixed-camming surface 27, these slides being radially retracted after the rollers have been fed to the gap 10'. The wheels 21 are also driven by the drive 20 and thus are synchronized with the belts so as to maintain the desired inter-roller spacing s.

As can be seen from FIG. 2, the steel rollers 7 have diameters D which are approximately equal to ten times the thickness d of the pressing belt 4.

In the best mode embodiment of the invention, the steel belt has a thickness of 1.5 mm and the roller 7 a diameter of 15 mm, the gap s being also about 1.5 mm. The deviations from these values, especially with respect to the diameter tolerances of the roller 7, should be below 15 microns and preferably below 10 microns.

When these conditions are observed, the torsional stresses which may develop in the roller 7 seldom create problems and indeed the restoring force opposing such torsion is generally greater than the friction force tending to maintain it. The rollers can move along stretches of 20 meters or more without bunching up.

I claim:

1. A press for the continuous production of pressedboard from a layer of comminuted material, said press comprising:

a pair of spaced-apart press platens;

respective steel pressing belts displaceable along said platens and juxtaposed with one another to define a space traversed by said layer and within which said layer is pressed, each of said belts being spaced from the respective platen to form a gap therewith;

a multiplicity of spaced-apart rod-shaped cageless rollers in each of said gaps; and means for feeding said rollers to said gaps with a spacing s substantially equal to the thickness d of said belts, said rollers having diameters D less than 20 mm and approximately equal to 10 d.

2. The press defined in claim 1 wherein the diameter D is between 11 and 18 mm and said thickness d is substantially 1.1 to 1.8 mm.

3. The press defined in claim 2 wherein the diameter D is substantially 14 to 16 mm and said thickness d is substantially 1.4 to 1.6 mm.

4. The press defined in claim 1 wherein said rollers have dimensional tolerances of less than 15 microns.

5. The press defined in claim 4 wherein said dimensional tolerances are less than 10 microns.

6. The press defined in claim 1, claim 2, claim 3, claim 4 or claim 5 wherein the means for feeding said rollers to said gaps include toothed wheels receiving said rollers between the teeth thereof and provided with ejectors for displacing said rollers from between the teeth of said wheels.

* * * * *